United States Patent
Kuramitsu et al.

[11] Patent Number: 5,186,082
[45] Date of Patent: Feb. 16, 1993

[54] IRONING PUNCH FOR MAKING SOCKET OF BALL-AND-SOCKET JOINT AND METHOD OF MANUFACTURING SUCH IRONING PUNCH

[75] Inventors: Masao Kuramitsu; Toshio Maki, both of Sayama, Japan

[73] Assignee: Honda Giken Kogyo Kabushiki Kaisha, Tokyo, Japan

[21] Appl. No.: 739,460

[22] Filed: Aug. 2, 1991

[30] Foreign Application Priority Data

Aug. 7, 1990 [JP] Japan .................. 2-208687

[51] Int. Cl.⁵ ............................................ B21J 13/02
[52] U.S. Cl. ................................. 76/107.1; 72/353.4
[58] Field of Search ............... 76/107.1; 72/347, 352, 72/353.4, 391, 476

[56] References Cited

U.S. PATENT DOCUMENTS

| | | | |
|---|---|---|---|
| 4,406,146 | 9/1983 | Suzuki | 72/353.4 |
| 4,610,155 | 9/1986 | Langford et al. | 72/353.4 |
| 4,768,368 | 9/1988 | Langford et al. | 72/353.4 |
| 4,843,864 | 7/1989 | Welschof | 72/353.4 |
| 5,001,920 | 3/1991 | Ishinaga et al. | 72/353.4 |

FOREIGN PATENT DOCUMENTS

| | | | |
|---|---|---|---|
| 0224833 | 9/1988 | Japan | 72/353.4 |
| 0104441 | 4/1989 | Japan | 72/353 |
| 0358784 | 3/1990 | Japan | 72/353.4 |
| 0421144 | 4/1991 | Japan | 72/353.4 |
| 8401529 | 4/1984 | PCT Int'l Appl. | 72/353.4 |

*Primary Examiner*—David Jones

[57] ABSTRACT

An ironing punch for ironing the socket of a ball-and-socket joint has a punch body with a plurality of circumferentially spaced ridges disposed on an outer circumferential surface thereof and extending from a distal end surface. The ironing punch also includes a plurality of ridge-shaped dies fitted respectively in recesses defined between the ridges on the punch body. Each of the ridges is ground by a single grinding wheel with the ridge-shaped dies removed from the punch body, and each of the ridge-shaped dies is also ground by a single grinding wheel. The punch body has relief grooves for preventing the grinding wheel from physical interference with junctions between the recesses and the distal end surface.

11 Claims, 8 Drawing Sheets

IRONING PUNCH FOR MAKING SOCKET OF BALL-AND-SOCKET JOINT AND METHOD OF MANUFACTURING SUCH IRONING PUNCH

BACKGROUND OF THE INVENTION

1. Field of the Invention

The present invention relates to an ironing punch for making the socket of a ball-and-socket joint for use as a constant-velocity universal joint or the like, and a method of manufacturing such an ironing punch.

2. Description of the Prior Art

The socket of a ball-and-socket joint comprises a cup-shaped socket body and an attachment shaft projecting outwardly from an outer surface of the bottom wall of the cup-shaped socket body. The cup-shaped socket body has a spherical inner surface with its center of curvature being positioned within the cup-shaped socket body. The spherical inner surface has a plurality of ball-rolling grooves extending along the generator thereof. A retainer-sliding surface is defined between each pair of adjacent ball-rolling surfaces. Each of the ball-rolling grooves has an arcuate portion extending in an intermediate region between an open end of the cup-shaped socket body and an inner surface of the bottom wall thereof and held substantially concentric with the retainer-sliding surfaces, a first straight portion extending from the arcuate portion to the open end, and a second straight portion extending from the arcuate portion to the inner surface of the bottom wall.

When the socket of the above structure is to be manufactured, a cup-shaped member of a socket blank is placed over an ironing punch, and ironed by a die which is forcibly squeezed over the peripheral wall of the cup-shaped member. The punch comprises a punch body and a plurality of ridge-shaped dies mounted on the punch body. The punch body has a distal end surface to be positioned in confronting relation to the inner surface of the bottom wall of the cup-shaped member. The punch body also has a plurality of ridges on the outer peripheral surface thereof for forming the ball-rolling grooves in the spherical inner surface of the cup-shaped socket body, the ridges extending from the distal end surface in the direction in which the cup-shaped member is ironed. The ridge-shaped dies are slidably fitted in grooves between the ridges, and serve to form the respective retainer-sliding surfaces on the spherical inner surface of the cup-shaped socket body.

Each of the ridges has a first forming region for forming one of the first straight portions of the ball-rolling grooves, a surface forming region for forming one of the retainer-sliding surfaces, and a second forming region for forming one of the second straight portions of the ball-rolling grooves. The distance between the crest surface of the first forming region and the crest surface of the surface forming region adjacent thereto is selected to be greater than the distance between the crest surface of a forming region for forming each of the arcuate portions and the second forming region and the crest surface of the surface forming region adjacent thereto.

The ridges of the punch body are grounded with the ridge-shaped dies being assembled on the punch body. Since the distance between the crest surface of the first forming region and the crest surface of the surface forming region adjacent thereto is greater than the distance between the crest surface of the forming region for forming the arcuate portion and the second forming region and the crest surface of the surface forming region adjacent thereto, as described above, a grinding wheel for grinding the ridges has an outer circumferential grinding surface matching the finished shape of the forming region for forming the arcuate portion, thereby avoiding physical interference between the grinding wheel and the ridge-shaped dies.

The grinding wheel can grind the forming regions for forming the arcuate portions and also the first forming regions for forming the first straight portions. However, the grinding wheel cannot grind the bottom or skirt areas of the first forming regions for forming the first straight portions.

It has been customary to finish the bottom or skirt areas of the first forming regions with an electric discharge process and then a manual grinding process. The conventional finishing practice is however inefficient and results in an increase in the cost of the punch.

SUMMARY OF THE INVENTION

In view of the conventional method of manufacturing an ironing punch, it is an object of the present invention to provide a method of manufacturing an ironing punch so that the various forming regions of each ridge of a punch body can be ground entirely by a single grinding wheel.

Another object of the present invention is to provide an ironing punch which includes ridges each having various forming regions that can be ground entirely by a single grinding wheel.

According to the present invention, there is provided a method of manufacturing an ironing punch for ironing the socket of a ball-and-socket joint from a cup-shaped member of a socket blank which is placed over the ironing punch, and ironed by a die which is forcibly squeezed over a peripheral wall of the cup-shaped member, the socket having a cup-shaped socket body with a spherical inner surface and an attachment shaft projecting from an outer surface of a bottom wall of the cup-shaped socket body, the spherical inner surface having a plurality of ball-rolling grooves extending along the generator thereof and a plurality of retainer-sliding surfaces each between adjacent ones of the ball-rolling grooves, each of the ball-rolling grooves having an arcuate portion extending in an intermediate region between an end surface defining an opening in the cup-shaped socket body and an inner surface of the bottom wall thereof, the arcuate portion being concentric with the retainer-sliding surfaces, a first straight portion extending from the arcuate portion to the end surface, and a second straight portion extending from the arcuate portion to the inner surface of the bottom wall.

The ironing punch comprises a punch body having a distal end surface confronting the inner surface of the bottom wall of the cup-shaped member and a plurality of ridges on an outer peripheral surface thereof for forming the ball-rolling grooves, respectively, the ridges extending from the distal end surface in the direction in which the socket blank is ironed, and a plurality of ridge-shaped dies slidably fitted in respective recesses each defined between adjacent ones of the ridges, for forming the retainer-sliding surfaces, respectively, each of the ridges having a first forming region for forming one of the first straight portions, an arcuate-portion forming region for forming one of the arcuate portions, and a second forming region for forming one of the second straight portions, each of the ridge-shaped dies having a surface forming region for forming one of the retainer-sliding surfaces, the distance between the crest surface of the first forming region of each of the ridges and the crest surface of the surface forming region of an adjacent one of the ridge-shaped dies being greater than the distance between the crest surface of the arcuate-portion forming region and the second forming region of each of the ridges and the crest surface of the surface forming region of an adjacent one of the ridge-shaped dies. The punch body has a relief groove in each of junctions between the recesses and the distal end surface of the punch body to avoid physical interference between the grinding wheel and the junctions when each of the ridges is ground with a grinding wheel with the ridge-shaped dies removed from the punch body.

The method comprises the steps of preparing a punch body blank having a distal end surface and a plurality of ridges with a plurality of recesses defined therebetween, each of the ridges having a first forming region, an arcuate-portion forming region, and a second forming region, which have a grinding allowance, forming a relief groove in each of junctions between the recesses and the distal end surface of the punch body blank, grinding the first forming region, the arcuate-portion forming region, and the second forming region of the punch body blank to remove the grinding allowance, with a grinding wheel having a grinding surface complementary in shape to each of the ground first forming regions of the punch body, while allowing the grinding wheel to enter the relief groove to avoid physical interference between the grinding wheel and the junctions, thereby forming the punch body, grinding a plurality of ridge-shaped die blanks each having a surface forming region which has a grinding allowance, into the ridge-shaped dies, respectively, and assembling the ground ridge-shaped dies on the ground punch body.

Since the ridges of the punch body blank are ground with the ridge-shaped dies removed therefrom, the various forming regions of the ridges can fully be ground with a single grinding wheel without physical interference between the grinding wheel and the ridge-shaped dies. The surface forming regions of the ridge-shaped dies can also fully be ground with a single grinding wheel without physical interference with the punch body.

Inasmuch as the various forming regions of the ridges can be ground with a single grinding wheel, the ironing punch can be manufactured highly efficiently at a reduced cost, and the ground forming regions of the ridges are of uniform accuracy.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
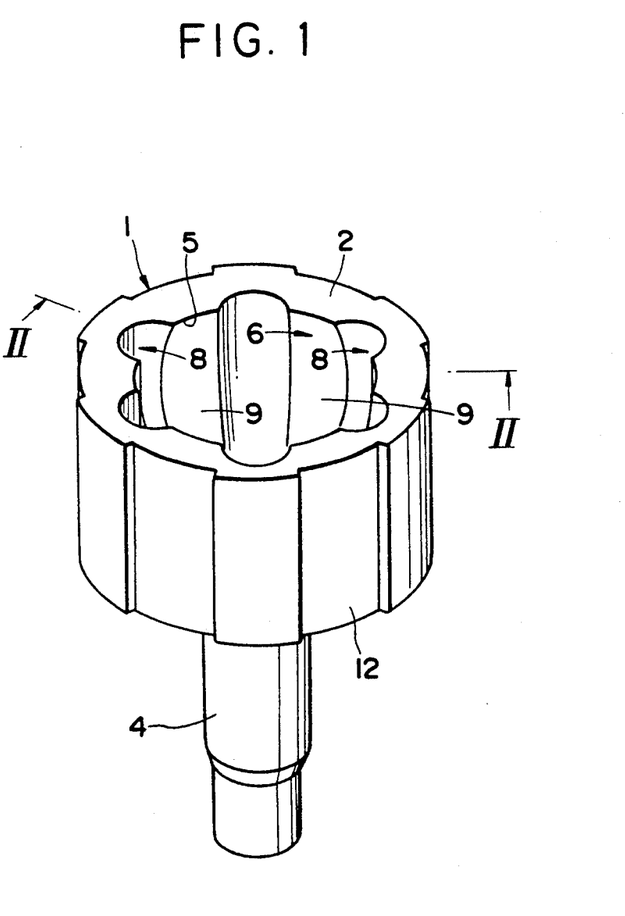
FIG. 1 is a perspective view of the socket of a ball-and-socket joint.
Figure 2:
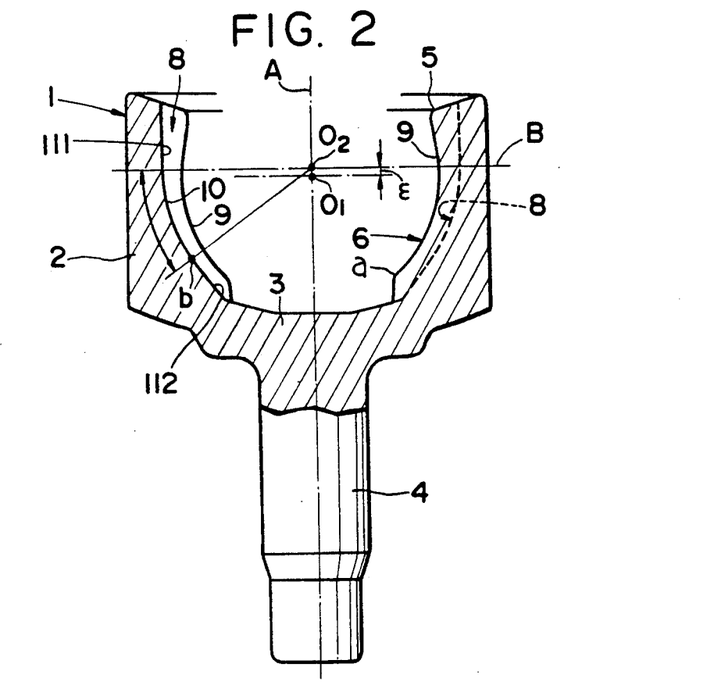
FIG. 2 is a cross-sectional view taken along line II—II of FIG. 1.

FIGS. 1 and 2 show the socket, generally designated by the reference numeral 1, of a ball-and-socket joint. The socket 1 comprises a cup-shaped socket body 2 and an attachment shaft 4 projecting outwardly from an outer surface of a bottom wall 3 of the cup-shaped socket body 2.

As shown in FIG. 2, the cup-shaped socket body 2 has a spherical inner surface 6 with its center $O_1$ of curvature being positioned within the cup-shaped socket body 2 between an opening 5 thereof and a region a adjacent to the inner surface of the bottom wall 3. The inner surface 6 has a plurality of, six in the illustrated embodiment, ball-rolling grooves 8 spaced at equal intervals in the circumferential direction and extending along the generator of the inner surface 6. Adjacent ones of the ball-rolling grooves 8 define therebetween retainer-sliding surfaces 9.

Each of the ball-rolling grooves 8 has an arcuate portion 10, a first straight portion 111, and a second straight portion 112. The arcuate portion 10 is concentric with the retainer-sliding surfaces 9, and lies in an inter mediate region between the end surface defining the opening 5 and the inner surface of the bottom wall 3, i.e., between a point b adjacent to the inner surface of the bottom wall 3 and a diametrical line B which passes through a center $O_2$ displaced from the center $O_1$ to the opening by a small distance and extends transversely across the axis A of the attachment shaft 4. The first straight portion 111 extends from the arcuate portion 10 and hence the diametrical line B to the end surface defining the opening 5. The second straight portion 112 extend from the arcuate portion 10 and hence the point b to t he inner surface of the bottom wall 3. The first straight portion 111 extends parallel to the axis A, and the second straight portion 112 extends radially inwardly from the point b.

As shown in FIG. 1, the socket 1 has a plurality of recesses 12 defined in the outer peripheral surface thereof in radial alignment with the respective retainer-sliding surfaces 9 and extending along the generator of the outer peripheral surface. The recesses 12 are formed by a die (described later on) in order to iron the peripheral wall portions corresponding to the retainer-sliding surfaces 9 at an increased rate.

Figure 3:
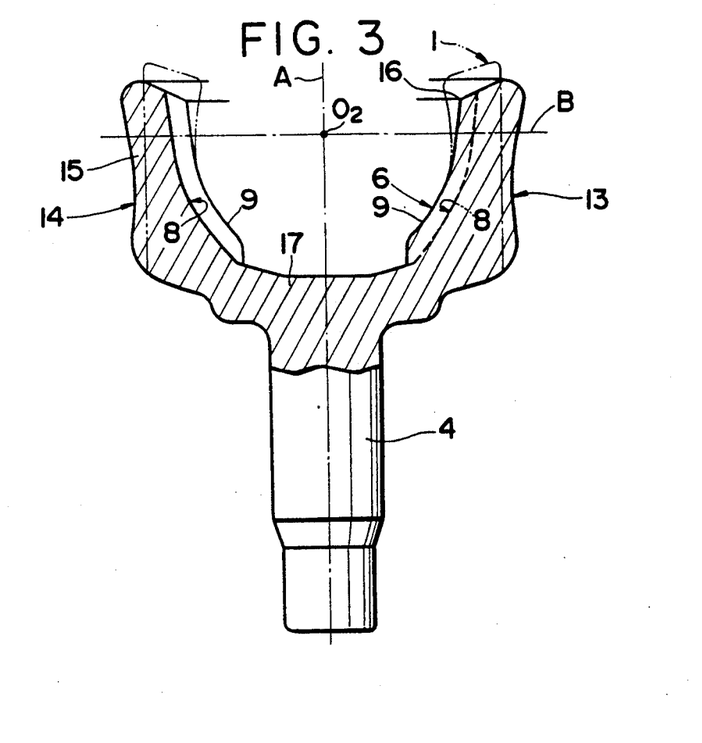
FIG. 3 is a cross-sectional view of a socket blank.

FIG. 3 shows a socket blank 13 which will be ironed into the socket 1. The socket blank 13 has a cup-shaped member 14 having ball-rolling surfaces 8 and retainer-sliding surfaces 9 which are roughly formed by a backward extrusion process. In the illustrated embodiment, the cup-shaped member 14 is of a relatively small depth, and has a relatively thick peripheral wall 15. The diametrical line B is positioned near an opening 16 of the cup-shaped member 14. Those portions of the ball-rolling surfaces 8 and the retainer-sliding surfaces 9 which are positioned on one side of the diametrical line B closer to the inner surface of a bottom wall 17 are substantially identical in shape to those of the finished socket 1. Those portions of the ball-rolling surfaces 8 and the retainer-sliding surfaces 9 which are positioned on the other side of the diametrical line B closer to the opening 16 are directly linearly outwardly toward the end surface defining the opening 16.

The outer peripheral surface spreads radially outwardly from an intermediate region which is positioned closer to the bottom wall 17 than the diametrical line B, toward the end surface defining the opening 16. This con figuration causes the peripheral wall 15 to be ironed at a progressively higher rate from the bottom wall 17 toward the end surface defining the opening 16.

Figure 4:
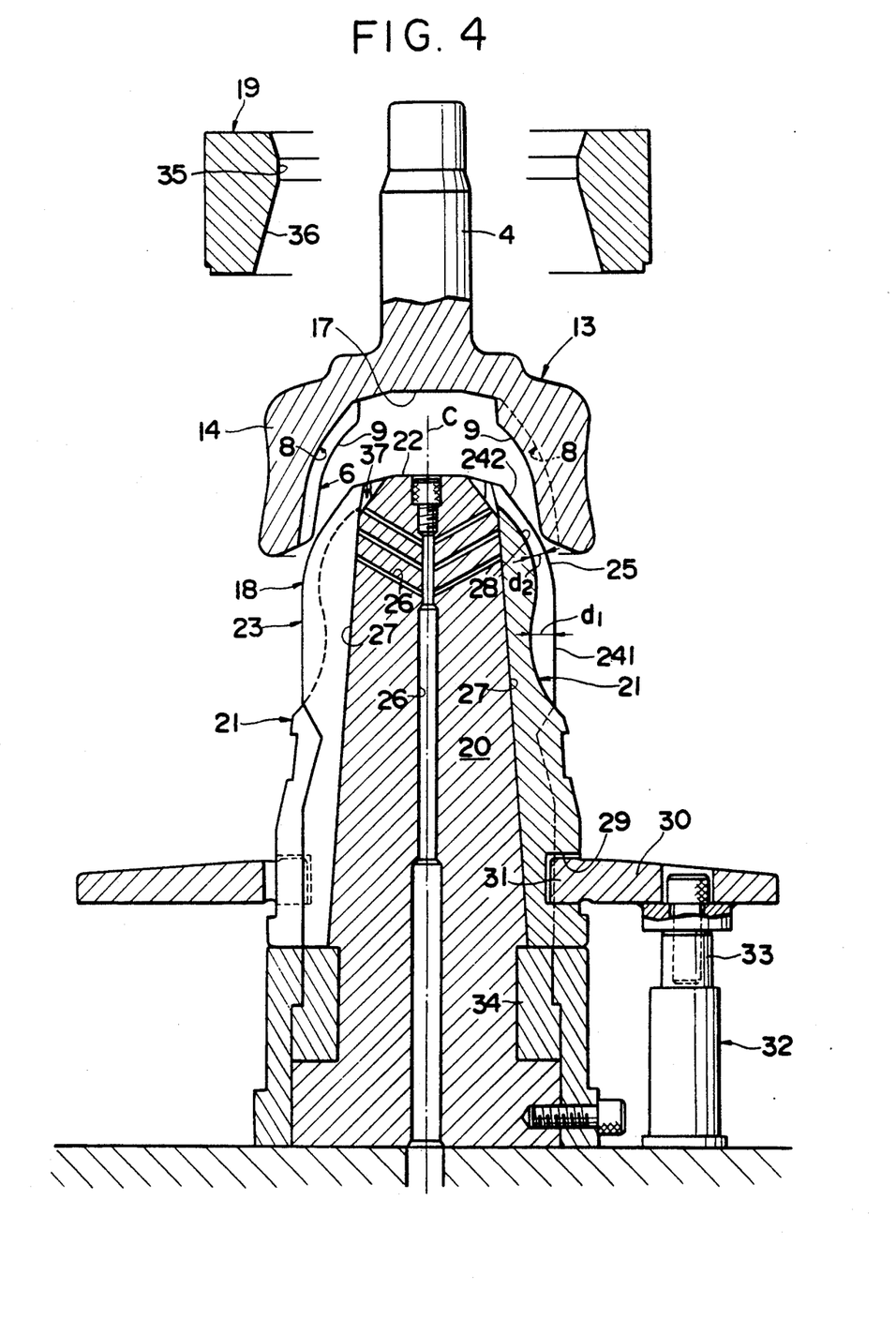
FIG. 4 is a cross-sectional view of a socket blank, an ironing punch, and a die before the socket blank is ironed.
Figure 5:
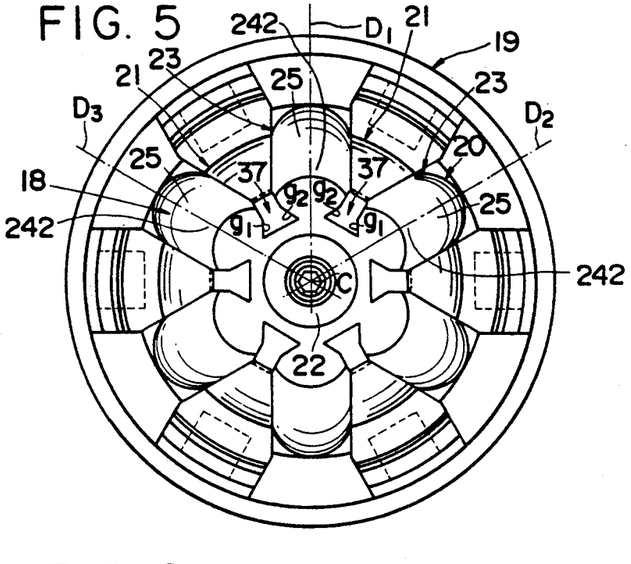
FIG. 5 is a plan view of the ironing punch.

An ironing punch 18 for ironing the socket blank 13 is shown in FIGS. 4 and 5.

The cup-shaped member 14 of the socket blank 13 is placed over the ironing punch 18, and ironed by a die 19 which is forcibly squeezed over the peripheral wall 15 of the cup-shaped member 14. The ironing punch 18 comprises a substantially cylindrical punch body 20 and a plurality of, six in the illustrated embodiment, ridge-shaped dies 21 mounted on the punch body 20.

The punch body 20 has a partly hemispherical distal end surface 22 which confronts the inner surface of the bottom wall 17 of the cup-shaped member 14 when the cup-shaped member 14 is placed over the punch body 20. The punch body 20 has on its outer peripheral surface a plurality of, six in the illustrated embodiment, circumferentially spaced ridges 23 for forming the ball-rolling grooves 8 in the inner peripheral surface of the cut-shaped member 14, the ridges 23 extending from the distal end surface 22 in the direction in which the socket blank 13 is ironed, i.e., along the axis C of the ironing punch 18. Each of the ridges 23 comprises a forming region 242 for forming one of the second straight portions 112 a forming region 25 for forming one of the arcuate portions 10, and a forming region 241 for forming one of the first straight portions 111, the forming regions 242, 25, 241 being arranged successively from the distal end surface 22. The forming regions 241, 25, 242 are of a semicircular transverse cross-sectional shape. The punch body 20 has a grease or lubricant mist hole 26 defined axially therethrough.

Each of the ridge-shaped dies 21 serves to form one of the retainer-sliding surfaces 9. The ridge-shaped dies 21 are slidably fitted in respective recesses 27 that are defined between adjacent ones of the ridges 23. Each of the ridge-shaped dies 21 has a forming region 28 near the distal end surface 22, for forming one of the retainer-sliding surfaces 9, the forming region 28 being of a semicircular transverse cross-sectional shape.

The bottom surface of each of the recesses 27 is inclined such that it progressively approaches the axis C of the punch body 20 in a direction from the forming region 241 toward the forming region 242. The inclined bottom surfaces of the recesses 27 allow the ridge-shaped dies 21 to be removed from the retainer-sliding surfaces 9 of the cut-shaped member 14.

The distance $d_1$ between the crest surface of the forming region 241 of each ridge 23 and the crest surface of the forming region 28 of an adjacent ridge-shaped die 21 is greater than the distance $d_2$ between the crest surface of the forming region 25 and the forming region 242 of each ridge 23 and the crest surface of the forming region 28 ($d_1 > d_2$).

The distance between the crest surface of the forming region 25 of each ridge 23 and the crest surface of the forming region 28 of an adjacent ridge-shaped die 21 is substantially equal to the distance between the crest surface of the forming region 242 of each ridge 23 and the crest surface of the forming region 28 of an adjacent ridge-shaped die 21.

Each of the ridge-shaped dies 21 has an engagement hole 29 defined therein in the vicinity of the lower end thereof and opening laterally outwardly. The ridge-shaped dies 21 are surrounded by a vertically movable annular plate 30 which has a plurality of lock fingers 31 engaging in the respective engagement holes 29. The vertically movable annular plate 30 is connected to the upper distal ends of piston rods 33 of a plurality of hydraulically or pneumatically operated cylinders 32.

When the piston rods 33 are retracted to lower the lower ends of the ridge-shaped dies 21 into abutment against the upper surface of a support base 34 in a lower portion of the punch body 20, the ridge-shaped dies 21 are located in an ironing position. When the piston rods 33 are extended up to the upper limit of their stroke, the upper distal ends of the ridge-shaped dies 21 are positioned upwardly of the distal end surface 22 of the punch body 20, and the ridge-shaped dies 21 are in a releasing position in which the ironed socket can be removed.

The die 19 is of an annular shape, and has an intermediate inner peripheral region serving as an ironing region 35 with its inside diameter smaller than the minimum outside diameter of the cut-shaped member 14. The die 19 also has a lower inner peripheral region extending downwardly from the intermediate inner peripheral region to the lower opening thereof, the lower inner peripheral region progressively spreading radially outwardly toward the lower opening and serving as a guide 36 for guiding the die 19 to fit over the cup-shaped member 14.

A process of ironing the socket blank 13 shown in FIG. 3 with the ironing punch 18 and the die 18 will be described below.

As shown in FIG. 4, the ridge-shaped dies 21 are held in the ironing position, and the cup-shaped member 14 of the socket blank 13 is placed over the ironing punch 18. With the inner surface of the bottom wall 17 of the cup-shaped member 14 being supported on the distal end surface 22 of the punch body 20, that ball-rolling grooves 8 and the retainer-sliding surfaces 9 which are roughly formed are fitted over the ridges 23 and the ridge-shaped dies 21, respectively.

Figure 6:
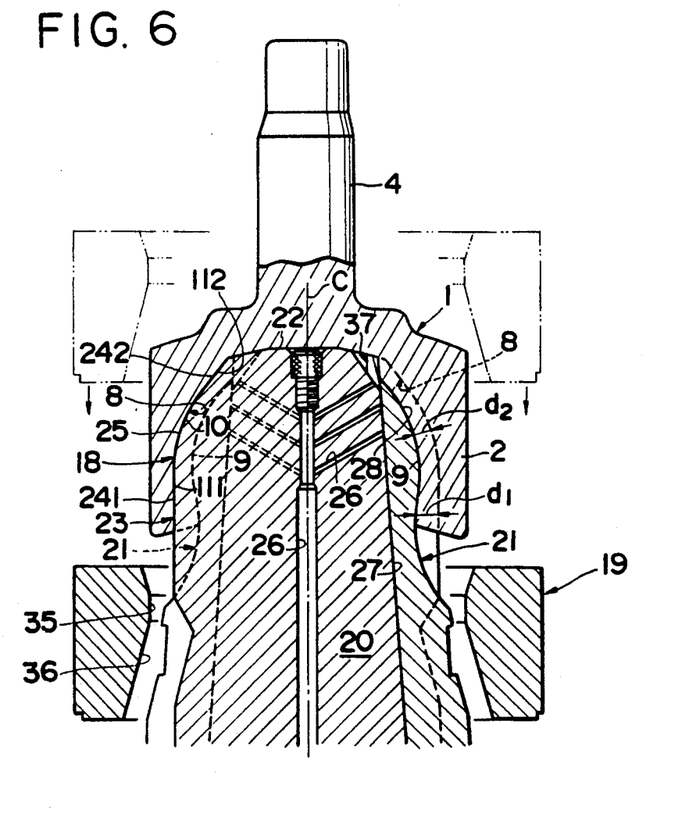
FIG. 6 is a fragmentary cross-sectional view showing a socket immediately after it is ironed by the ironing punch and die.

Then, as shown in FIG. 6, the die 19 is lowered, and the ironing region 35 thereof is guided by the guide 36 into biting engagement with the peripheral wall 15 of the socket blank 11. As the die 19 is forcibly lowered further, the peripheral wall 15 is deformed radially inwardly and extended axially downwardly by the ironing region 35, while at the same time the ball-rolling grooves 8 and the retainer-sliding surfaces 9 are plastically deformed into contact with and by the forming regions 241, 242, 25, 28 of the ridges 23 and the ridge-shaped dies 21. When the die 19 is lowered past the socket blank 13, the socket blank 13 is finished as the socket 1.

Figure 7:
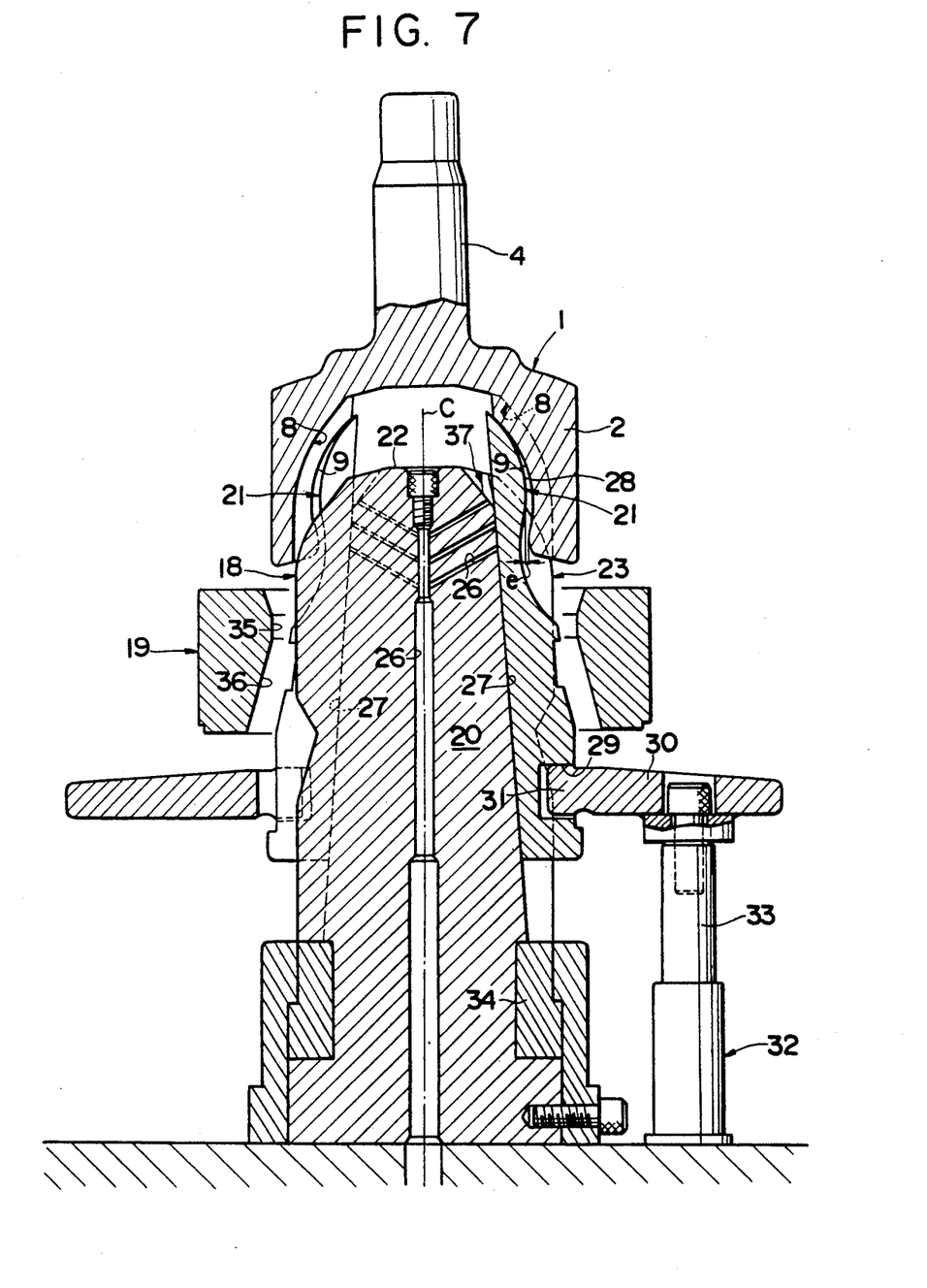
FIG. 7 is a cross-sectional view showing the manner in which the ironed socket is removed from the ironing punch.

Thereafter, as shown in FIG. 7, the cylinders 32 are operated to lift the ridge-shaped dies 21 and hold them in the releasing position. Since the ridge-shaped dies 21 progressively move toward the axis C while they are being elevated, the distance between the diametrically opposite ridge-shaped dies 21 is progressively reduced, leaving a gap e between the ends of the retainer-sliding surfaces 9 at the opening 5 and the forming regions 28 of the ridge-shaped dies 21. Therefore, the finished socket 1 can be removed from the ironing punch 18 because of the gap e thus formed.

Figure 8:
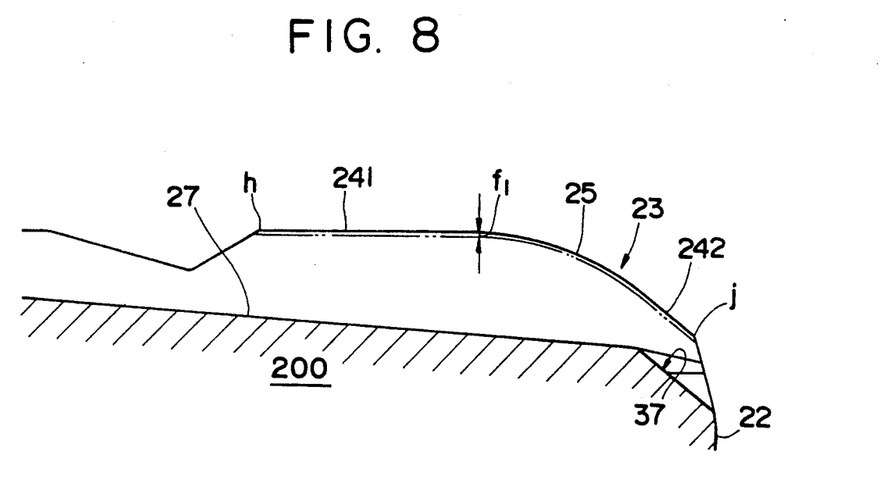
FIG. 8 is a fragmentary cross-sectional view of a punch body.
Figure 9:
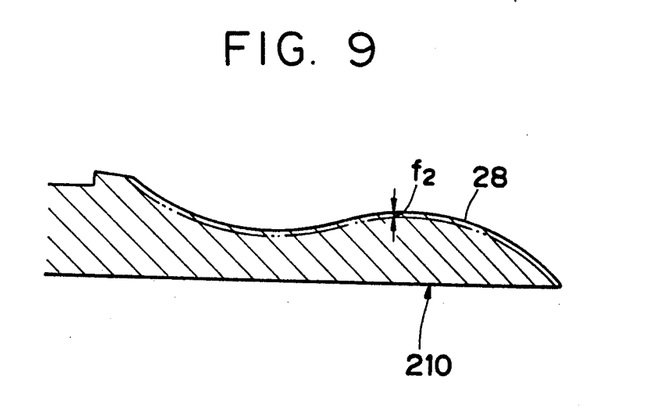
FIG. 9 is a fragmentary cross-sectional view of a ridge-shaped die.

The ironing punch 18 is manufactured as follows:

As shown in FIGS. 8 and 9, a punch body blank 200 is prepared which has a plurality of ridges 23 each comprising a first forming region 241, a forming region 25, and a forming region 242, which have a grinding allowance $f_1$, and a plurality of ridge-shaped die blanks 210 are prepared which each have a forming region 28 having a grinding allowance $f_2$.

As illustrated in FIG. 8, the punch body blank 200 has a relief groove 37 defined at the junction between each recess 27 and the distal end surface 22, so that the punch body blank 200 will rot physically interfere with a grinding wheel at the junction. As shown in FIG. 5, each of the relief grooves 37 has a dovetail-shaped cross section as viewed in a plane normal to the axis C of the punch body 20. Each forming region 242 is sandwiched between two relief grooves 37, and inner sides $g_1$ of these two relief grooves 37 which are remote from a bisector $D_1$ that bisects parallel to the bisector $D_1$. Inner sides $g_2$ of the relief grooves 37 which are closer to the bisector $D_1$ lie parallel to bisectors $D_2$, $D_3$ which bisect adjacent forming regions 242.

Figure 10:
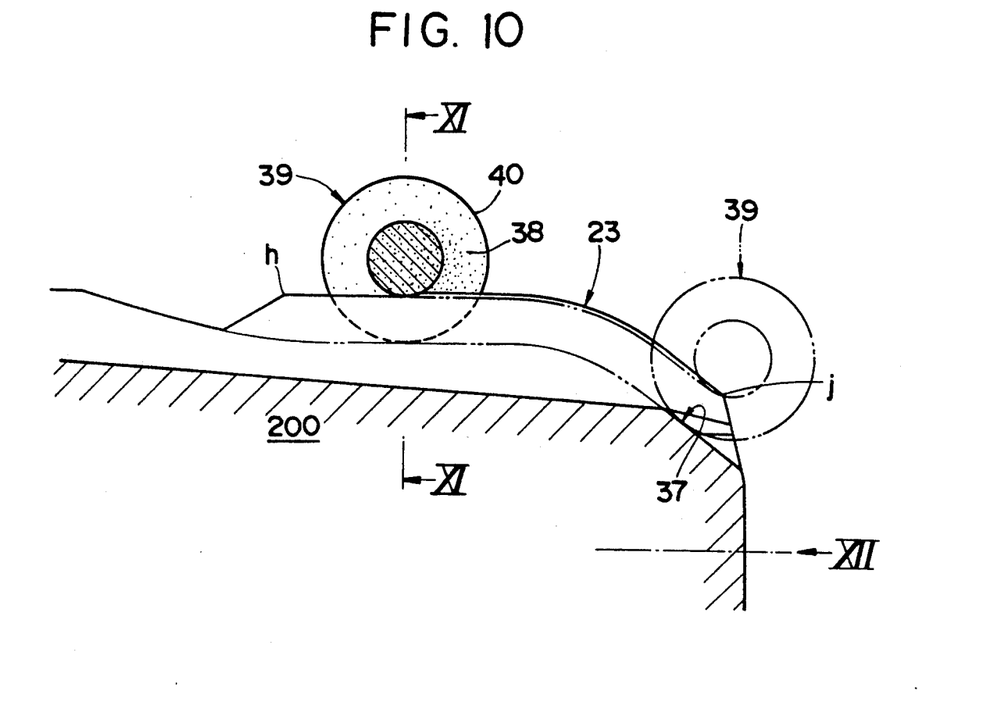
FIG. 10 is a fragmentary cross-sectional view illustrating the manner in which the punch body is grounded by a grinding wheel.
Figure 11:
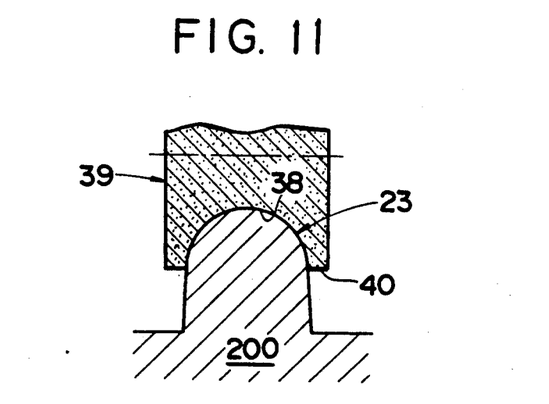
FIG. 11 is a cross-sectional view taken along line XI—XI of FIG. 10.
Figure 12:
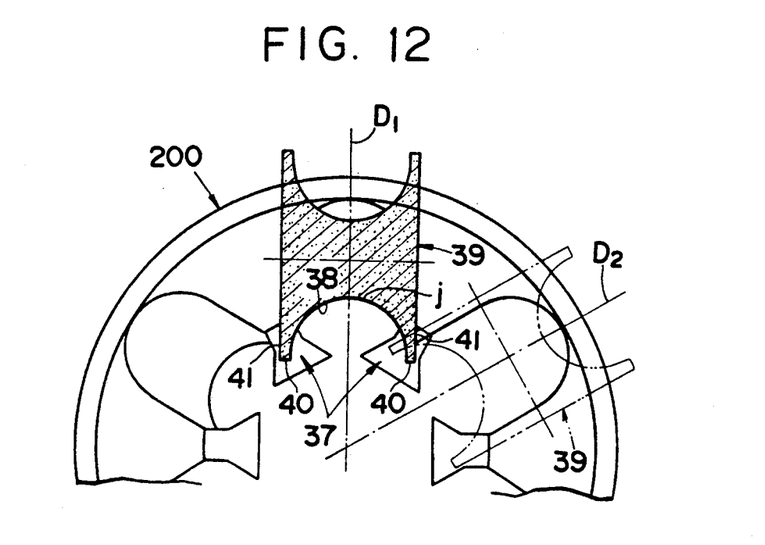
FIG. 12 is a view as viewed in the direction indicated by the arrow XII in FIG. 10.

As shown in FIGS. 10 through 12, a grinding wheel 39 has a grinding surface 38 of an arcuate concave transverse cross section on its outer circumferential side edge 40, the grinding surface 38 being of a shape complementary to the finished shape of the forming region 241. The grinding wheel 38 has opposite side surfaces 41 (see FIG. 12).

Each of the ridges 23 of the punch body 20 is ground as follows: As shown in FIG. 10, each of the ridges 23 is ground from a starting end h of the forming region 241 to a terminal end j of the forming region 242 by the grinding wheel 39 which rolls on the ridge 23. At the terminal end j of the forming region 242, the grinding wheel 39 enters the relief grooves 37 on opposite sides of the ridge-shaped die 21 so that the outer circumferential side edge 40 and outer sides 41 of the grinding wheel 39 do not physically interfere with the punch body 20. The forming region 241, the forming region 25, and the forming region 242 of each ridge 23 can successively be ground by the single grinding wheel 39. Each ridge 23 can be ground easily and smoothly since the grinding process is not hampered by the ridge-shaped dies 21.

Figure 13:
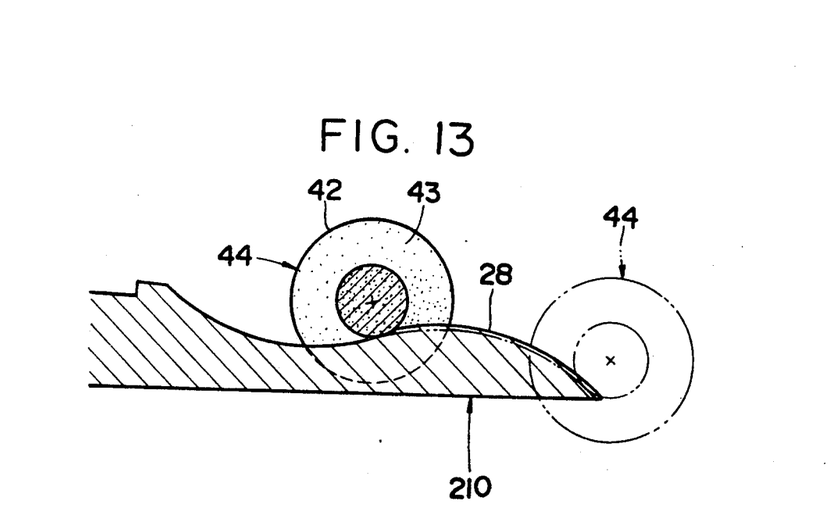
FIG. 13 is a fragmentary cross-sectional view illustrating the manner in which a ridge-shaped die is grounded.

The forming region 28 of each of the ridge-shaped dies 21 is ground by a grinding wheel 44 (see FIG. 13). The grinding wheel 44 has a grinding surface 43 of an arcuate concave transverse cross section on its outer circumference 42, the grinding surface 43 being of a shape complementary to the finished shape of the forming region 28. When the forming region 28 is to be ground, the ridge-shaped die 21 which has been detached from the punch body 20 is held in position by a jig (not shown). The forming region 28 can easily and smoothly be ground by the grinding wheel 44 because the grinding process is not hampered by punch body 20.

The ridge-shaped dies 21 thus finished are fitted in the respective recesses 27 of the punch body 20, thus completing the ironing punch 18.

In the ironing punch 18 thus assembled, the distance $d_1$ between the crest surface of the forming region 241 of each ridge 23 and the crest surface of the forming region 28 of an adjacent ridge-shaped die 21 is greater than the distance $d_2$ between the crest surface of the forming region 25 and the forming region 242 of each ridge 23 and the crest surface of the forming region 28, as described above.

The six ridge-shaped dies 21 may be radially held in angularly equally spaced relationship by a jig (not shown) with the forming regions 28 facing radially outwardly, and the forming regions 28 may be simultaneously ground by a numerically controlled cylindrical grinder. The ridge-shaped dies 21 may also be ground by a numerically controlled lathe.

Although a certain preferred embodiment of the present invention has been shown and described in detail, it should be understood that various changes and modifications may be made therein without departing from the scope of the appended claims.

What is claimed is:

1. A method of manufacturing an ironing punch for forming a socket of a ball-and-socket joint wherein a cup-shaped socket blank is placed over said ironing punch and said cup-shaped socket blank is ironed by an annular die which is forcibly squeezed over an outer peripheral wall of said cup-shaped socket blank, said ironing punch comprising a substantially cylindrical punch body having a plurality of ground ridges integrally formed around said punch body with recesses therebetween, and a plurality of ground ridge-shaped dies slidably fitted into said recesses between said ground ridges, the method comprising the steps of:

preparing a punch body blank, said punch body blank having a distal end surface and a plurality of unground ridges formed along an outer surface of said punch body blank with a plurality of recesses defined between said unground ridges, wherein each of said unground ridges comprises a first forming region, an arcuate forming region disposed adjacent said first forming region, and a second forming region disposed adjacent said arcuate forming regions, each of said unground ridges being formed with a grinding allowance;

forming a relief groove in each of junctions between said recesses and said distal end surface of said punch body blank;

grinding said first forming region, said arcuate forming region, and said second forming region of each of said unground ridges of said punch body blank with a grinding wheel to remove said grinding allowance and thereby form said punch body, said grinding wheel having a grinding surface complementary in shape to said first forming region, wherein said grinding wheel is allowed to enter into said relief groove during grinding to avoid physical interference between said grinding wheel and said junctions;

preparing a plurality of unground ridge-shaped die blanks each having a surface forming region having a grinding allowance;

grinding said unground ridge-shaped die blanks to remove said grinding allowance thereby forming said ground ridge-shaped dies; and assembling the ground ridge-shaped dies onto said punch body.

2. The method according to claim 1, wherein said step of grinding said first forming region, said arcuate forming region and said second forming region further comprises:

providing said grinding surface of said grinding wheel with a concave shape extending along an entire outer circumference of said grinding wheel; and grinding said first forming region, said arcuate forming region, and said second forming region with said grinding wheel by rolling said concave grinding surface along said unground ridges of said punch body blank.

3. The method according to claim 1, wherein said step of grinding said first forming region, said arcuate forming region and said second forming region further comprises:

providing said grinding surface of said grinding wheel with a concave shape extending along an entire outer circumference of said grinding wheel, and further having a side edge along said outer circumference of said grinding wheel; and grinding said first forming region, said arcuate forming region, and said second forming region with said grinding wheel by rolling said concave grinding surface along said unground ridges of said punch body blank while allowing said side edge to pass through said relief groove.

4. The method according to claim 3, wherein said step of grinding said relief groove further comprises forming said relief groove to have a dovetail-shaped cross section.

5. The method according to claim 1, wherein said step of grinding said unground ridge-shaped die blanks further comprises:

providing another grinding wheel having a concave-shaped grinding surface extending along an entire circumference of said other grinding wheel; and grinding each of said unground ridge-shaped die banks by rolling said other grinding wheel along a surface forming region of said unground ridge-shaped die blanks.

6. A method of manufacturing an ironing punch for forming a socket of a ball-and-socket joint wherein a cup-shaped socket blank is placed over said ironing punch and said cup-shaped socket blank is ironed by an annular die which is forcibly squeezed over an outer peripheral wall of said cup-shaped socket blank, the method comprising the steps of:

preparing a punch body blank, said punch body blank having a substantially hemispherical distal end surface and a substantially cylindrical shape extending toward an opposite end, said punch body blank having a plurality of circumferentially spaced unground ridges formed along an outer circumferential surface of said punch body blank extending form said distal end surface toward said opposite end, for forming respective ball-rolling grooves in said socket wherein each of said ball-rolling grooves comprises a first straight portion, an arcuate portion adjacent said first straight portion, and a second straight portion adjacent said arcuate portion, each of said unground ridges being formed with a grinding allowance;

preparing a plurality of unground ridge-shaped die blanks each having a surface forming region having a grinding allowance, for forming respective retainer sliding surfaces in said socket, wherein said ridge-shaped die blanks are fitted into respective recesses defined between adjacent ridges of said punch body blank;

forming a relief groove in each of junctions between said recesses and said distal end surface of said punch body blank;

grinding said unground ridges of said punch body blank with a grinding wheel to remove said grinding allowance and thereby form said punch body, said grinding wheel having a grinding surface complementary in shape to said ball-rolling grooves for forming on each of said ridges a first forming region for forming said first straight portion, an arcuate forming region for forming said arcuate portion, and a second forming region for forming said second straight portion, wherein said grinding wheel is allowed to enter into said relief groove during grinding to avoid physical interference between said grinding wheel and said junctions;

grinding said unground ridge-shaped die blanks to remove said grinding allowance and thereby form said ground ridge-shaped dies, wherein said ridge-shaped die blanks are ground to produce surface forming regions thereon for forming said respective retainer sliding surfaces; and assembling said ground ridge-shaped dies onto said punch body.

7. The method according to claim 6, wherein said assembling step further comprises assembling the ground ridge-shaped dies on said punch body such that said ground ridge-shaped dies are disposed adjacent to each of said ground ridges on said punch body, and wherein a distance ($d_1$) between a crest surface of said first forming region of each of said ground ridges and a crest surface of said surface forming regions of said ground ridge-shaped dies disposed adjacent thereto is greater that a distance ($d_2$) between a crest surface of said arcuate forming region and said second forming region of each of said ground ridges and a crest surface of said surface forming regions of said ground ridge-shaped dies disposed adjacent thereto.

8. The method according to claim 6, wherein said step of grinding said unground ridges of said punch body blank further comprises:

providing said grinding surface of said grinding wheel with a concave shape extending along an entire outer circumference of said grinding wheel; and grinding said first forming region, said arcuate forming region, and said second forming region with said grinding wheel by rolling said concave grinding surface along said unground ridges of said punch body blank.

9. The method according to claim 6, wherein said step of grinding said unground ridges of said punch body blank further comprises:

providing said grinding surface of said grinding wheel with a concave shape extending along an entire outer circumference of said grinding wheel, and further having a side edge along said outer circumference of said grinding wheel; and grinding said first forming region, said arcuate forming region, and said second forming region with said grinding wheel by rolling said concave grinding surface along said unground ridges of said punch body blank while allowing said side edge to pass through said relief groove.

10. The method according to claim 9, wherein said step of grinding said relief groove further comprises forming said relief groove to have a dovetail-shaped cross section.

11. The method according to claim 6, wherein said step of grinding said unground ridge-shaped die blanks further comprises:
providing an other grinding wheel having a concave-shaped grinding surface extending along an entire circumference of said other grinding wheel; and
grinding each of said unground ridge-shaped die blanks by rolling said other grinding wheel along a surface forming region of said unground ridge-shaped die blanks.

* * * * *